(12) United States Patent
Bailey

(10) Patent No.: US 6,764,196 B2
(45) Date of Patent: Jul. 20, 2004

(54) LIGHTING SYSTEM

(76) Inventor: Bendrix B. Bailey, 34 Gerrish Rd., Rochester, MA (US) 02770

( * ) Notice: Subject to any disclaimer, the term of this patent is extended or adjusted under 35 U.S.C. 154(b) by 0 days.

(21) Appl. No.: 10/318,885

(22) Filed: Dec. 13, 2002

(65) Prior Publication Data

US 2003/0081410 A1 May 1, 2003

Related U.S. Application Data

(63) Continuation of application No. 09/821,436, filed on Mar. 29, 2001, now Pat. No. 6,540,373.

(51) Int. Cl.[7] ................................................. F21S 8/00
(52) U.S. Cl. ........................ 362/147; 362/800; 362/150; 362/404
(58) Field of Search ................................ 362/800 LED, 362/148 LED, 150 LED, 364 LED, 249 LED, 241 LED, 367 LED, 404 LED, 147 LED, 252 LED

(56) References Cited

U.S. PATENT DOCUMENTS

| | | | |
|---|---|---|---|
| 3,892,959 A | * | 7/1975 | Pulles ........................... 362/31 |
| 4,173,035 A | * | 10/1979 | Hoyt ........................... 362/249 |
| 4,195,330 A | * | 3/1980 | Savage, Jr. ................... 362/226 |
| 4,438,613 A | | 3/1984 | Hinsta et al. |
| 4,471,415 A | * | 9/1984 | Larson et al. ................. 362/250 |
| 4,480,293 A | * | 10/1984 | Wells ........................... 362/108 |
| 4,613,930 A | | 9/1986 | Ambasz |
| 5,024,034 A | | 6/1991 | Gailey |
| 5,025,355 A | * | 6/1991 | Harwood ..................... 362/147 |
| 5,050,360 A | | 9/1991 | Gailey |
| 5,412,542 A | * | 5/1995 | Mandy .......................... 362/20 |
| 5,833,355 A | | 11/1998 | You et al. |
| 5,931,570 A | | 8/1999 | Yamuro |
| 6,070,995 A | | 6/2000 | Kanai |
| 6,260,981 B1 | | 7/2001 | Fiene |
| 6,435,691 B1 | | 8/2002 | Macey et al. |
| 6,540,373 B2 | * | 4/2003 | Bailey ......................... 362/150 |

OTHER PUBLICATIONS

Displaying a Winning Glow, http://www.britanica.com/..ince/article/print/0,5746,315315,00.html, Jan./Feb. 1999, pp. 1–8.

Low–Voltage LED Wall & Ceiling Lights, http://www.jet-streampower.com/page 11.html, pp. 1–2.

Complete Pre–Wired LED Fixtures, http://www.theledlight.com/led–fixutures.html, (c) 1997, 1998, 1999, 2000, pp. 1–9.

* cited by examiner

*Primary Examiner*—Sandra O'Shea
*Assistant Examiner*—Sharon Payne
(74) *Attorney, Agent, or Firm*—Cesari and McKenna, LLP

(57) ABSTRACT

An overhead lighting system is formed by embedding a plurality of light elements within a support structure, such as a ceiling panel of a suspended ceiling. The light elements are preferably ultra-bright light emitting diodes (LEDs). The LEDs are mounted in the ceiling panel so that the light emitted from each LED projects from a first surface of the ceiling panel and down into a respective space.

25 Claims, 9 Drawing Sheets

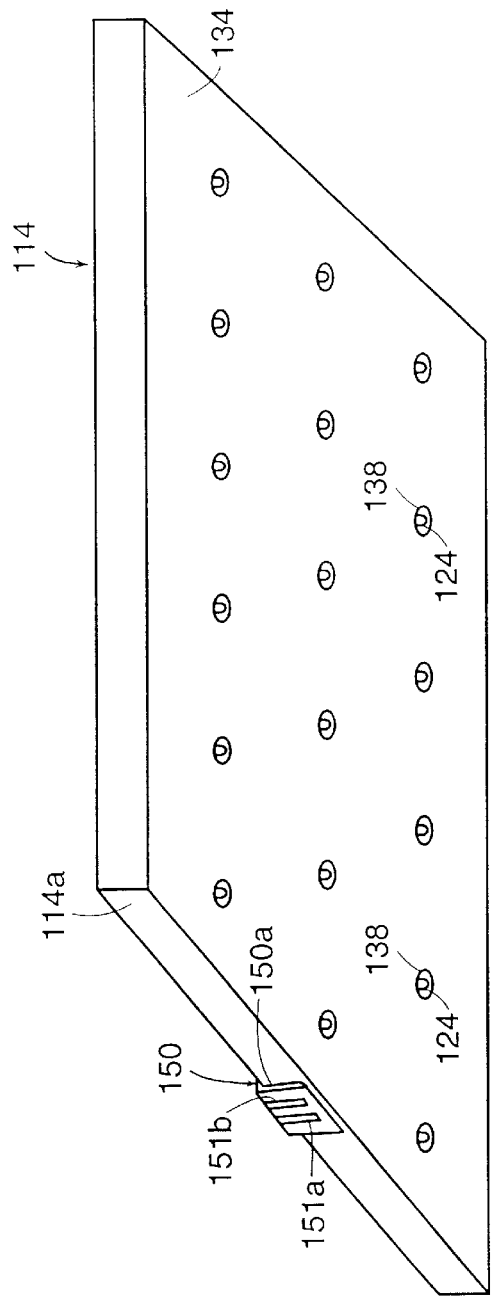
FIG. 3
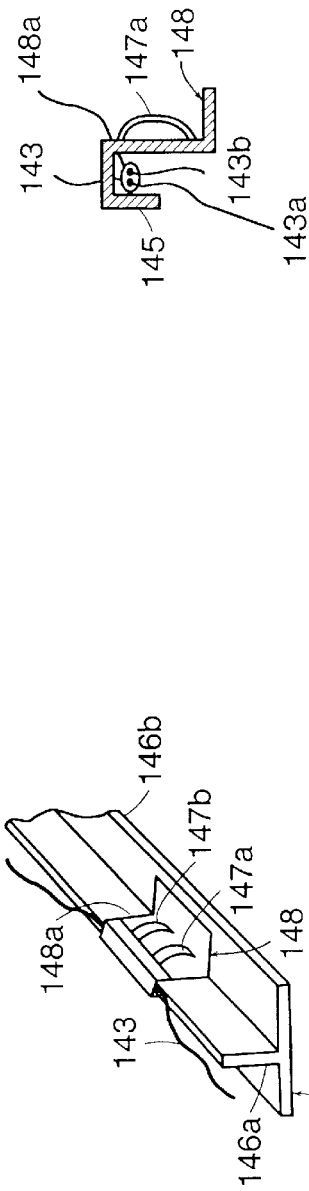
FIG. 5B
FIG. 5A

US 6,764,196 B2

LIGHTING SYSTEM

RELATED APPLICATIONS

The present application is a continuation of Ser. No. 09/821,436, which was filed on Mar. 29, 2001, by Bendrix L. Bailey for a LIGHTING SYSTEM, now U.S. Pat. No. 6,540,373.

BACKGROUND OF THE INVENTION

1. Field of the Invention

This invention relates to lighting systems and, more specifically, to a lighting system in which a plurality of light elements are embedded in or mounted to a support structure.

2. Background Information

Many commercial spaces, such as offices, have suspended ceilings that are spaced from a permanent ceiling. A suspended ceiling allows utility items, such as pipes, ductwork, electrical wiring, computer cabling, etc. to be placed in the space between the permanent ceiling and the suspended ceiling. The utility items are thus kept out of sight from the occupant of the office, and yet remain relatively accessible for repairs and other work. The suspended ceiling typically includes a grid or frame that is formed from a plurality of interlocking, inverted metal "T" beams or rails. The grid may be hung from the permanent ceiling by a series of cables or wires that are anchored to the permanent ceiling. The "T" beams or rails of the grid define a plurality of open, rectangular-shaped spaces into which ceiling panels or tiles are placed.

To provide overhead lighting in spaces having suspended ceilings, light fixtures are installed in place of several ceiling panels. For example, for every 15 or so ceiling panels, a light fixture is installed. The light fixtures typically mount flush to the suspended ceiling, and replace an entire ceiling panel. The light fixtures include one or more fluorescent tubes to provide the light, and are similarly supported by the suspended ceiling frame. A diffuser or grid may also be provided so as to diffuse the light being emitted by the fluorescent tube(s). Electrical power is provided to the light fixtures by running electrical lines to them. In particular, electrical lines are run from a junction or distribution box to the light fixture through the space between the permanent and suspended ceilings.

Although fluorescent tubes typically require less power than incandescent bulbs for roughly the same luminescence, they still can be relatively expensive to operate. For example, fluorescent tubes have a limited life. Thus, the tubes must be frequently checked and replaced. Their power consumption, moreover, is not insignificant. As a result, the use of fluorescent tube-based light fixtures contributes to the high operating costs faced by many businesses and other organizations who rent and own office and manufacturing facilities.

Accordingly, a need exists for a lighting system that is especially suited to overhead lighting applications, and yet is less costly to install and/or operate than light fixtures having fluorescent tubes.

SUMMARY OF THE INVENTION

Briefly, the invention is directed to a lighting system in which a plurality of light elements are embedded within or mounted to a support structure. In accordance with a preferred embodiment, the support structure is a ceiling panel for use with a suspended ceiling, and the light elements are ultra-bright light emitting diodes (LEDs). Such LEDs have lower power requirements and longer lives than fluorescent tubes. The panel is generally rectangular in shape and defines first and second opposing surfaces. The LEDs are mounted in the ceiling panel so that the light emitted by each LED projects from the first surface of the ceiling panel. Thus, upon installation of the panel in the grid of the suspended ceiling, the light generated by the LEDs shines down from the panel and into the corresponding space. The panel may have a plurality of conical or concave recesses formed in its first surface for receiving the LEDs. The recesses may have a reflective surface to increase the amount of light being delivered into the room. A conductive strip that may be attached to the second surface of the panel preferably contains electrical leads that wire the LEDs into a series circuit. A direct current (DC) voltage is applied to the conductive strip, thereby powering the LEDs embedded within the panel.

BRIEF DESCRIPTION OF THE DRAWINGS

The invention description below refers to the accompanying drawings, of which:

FIG. 3 is an isometric view of a ceiling panel illustrating its first or lower surface;

FIG. 5A is a partial isometric view of a grid element and a rail connector;

FIG. 5B is an end view of the rail connector of FIG. 5A;

DETAILED DESCRIPTION OF AN ILLUSTRATIVE EMBODIMENT

Figure 1:
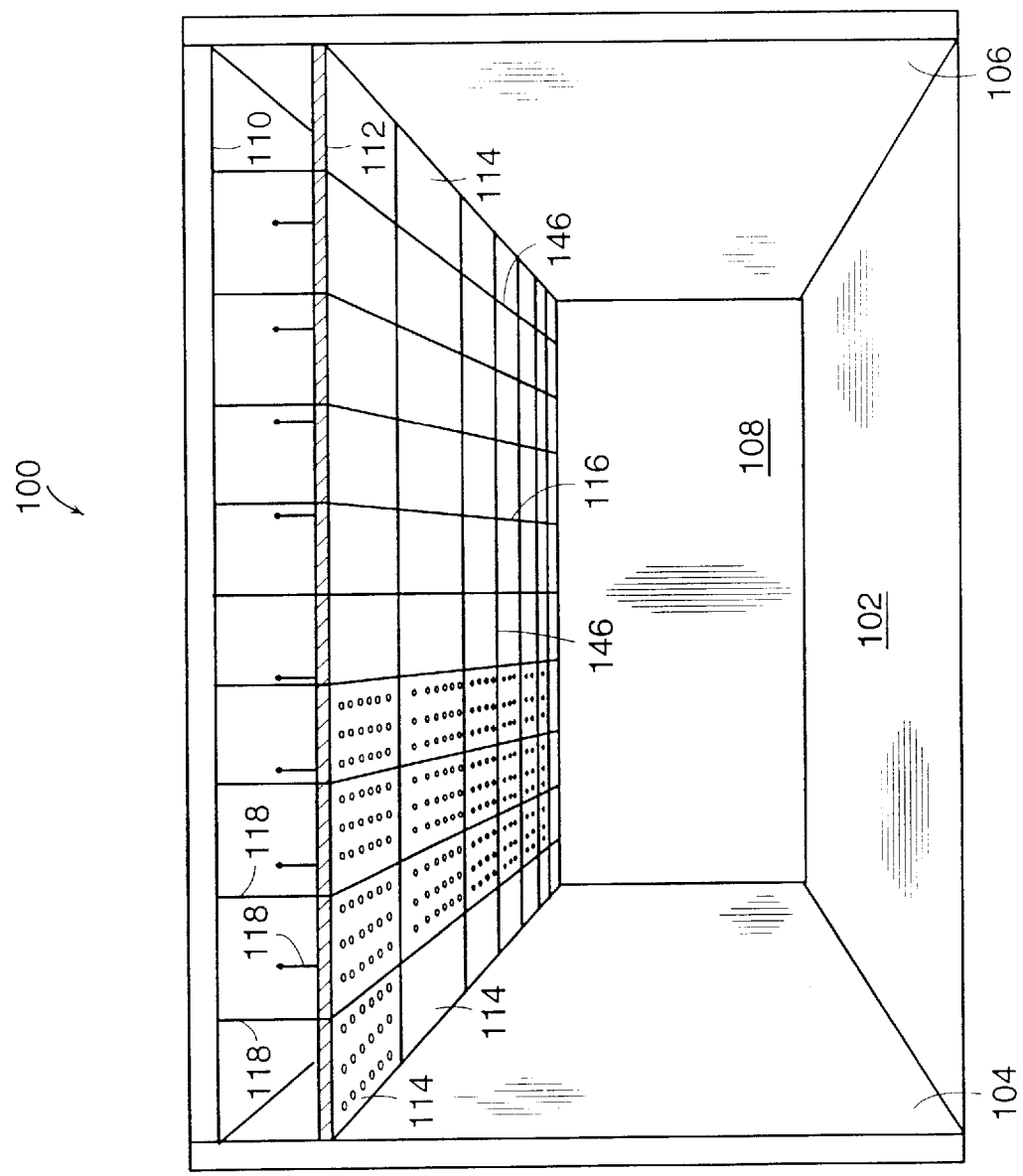
FIG. 1 is a perspective view of a room having a suspended ceiling in accordance with the present invention.

FIG. 1 is a perspective view of an office or room 100 illustrating an exemplary embodiment of the present invention. The room 100 includes a floor 102, two opposing side walls 104 and 106, a back wall 108 and a permanent ceiling 110. Spaced from the permanent ceiling 110 is a suspended ceiling 112. The suspended ceiling 112 is made up of a plurality of ceiling panels 114 held in place by a metal grid or frame 116. As described below, the grid 116 consists of a plurality of inverted "T" rails. The rails are interconnected with each other to form rectangular-shaped openings into which the ceiling panels 114 are placed. The metal grid 116 hangs from the permanent ceiling 110 by a plurality of cables 118. Each cable 118 has a first end that is anchored to the permanent ceiling 110 and a second end that is attached to the metal grid 116.

Figure 2:
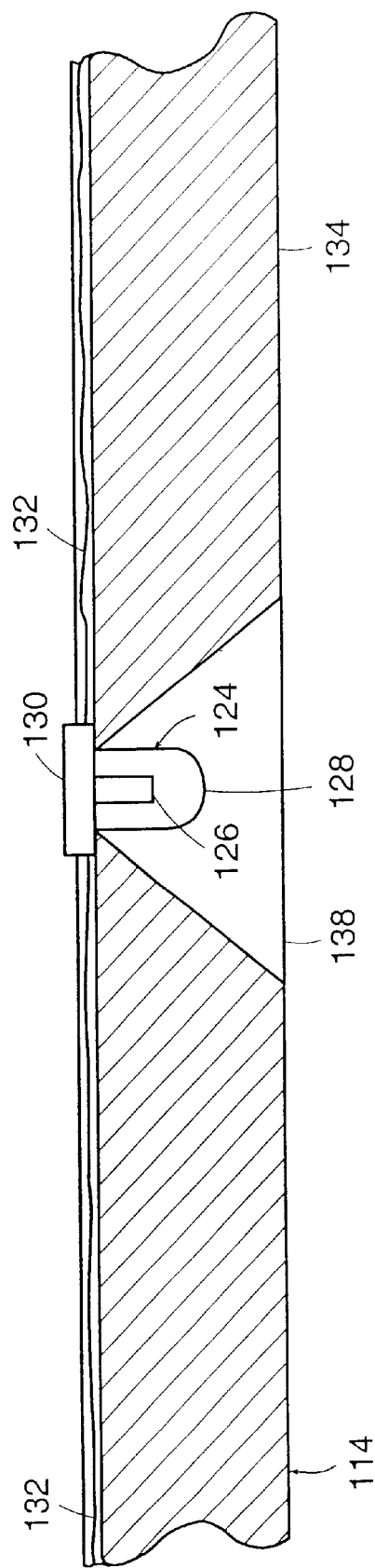
FIG. 2 is a cross-sectional view of a ceiling panel illustrating the light element in detail.
Figure 4:
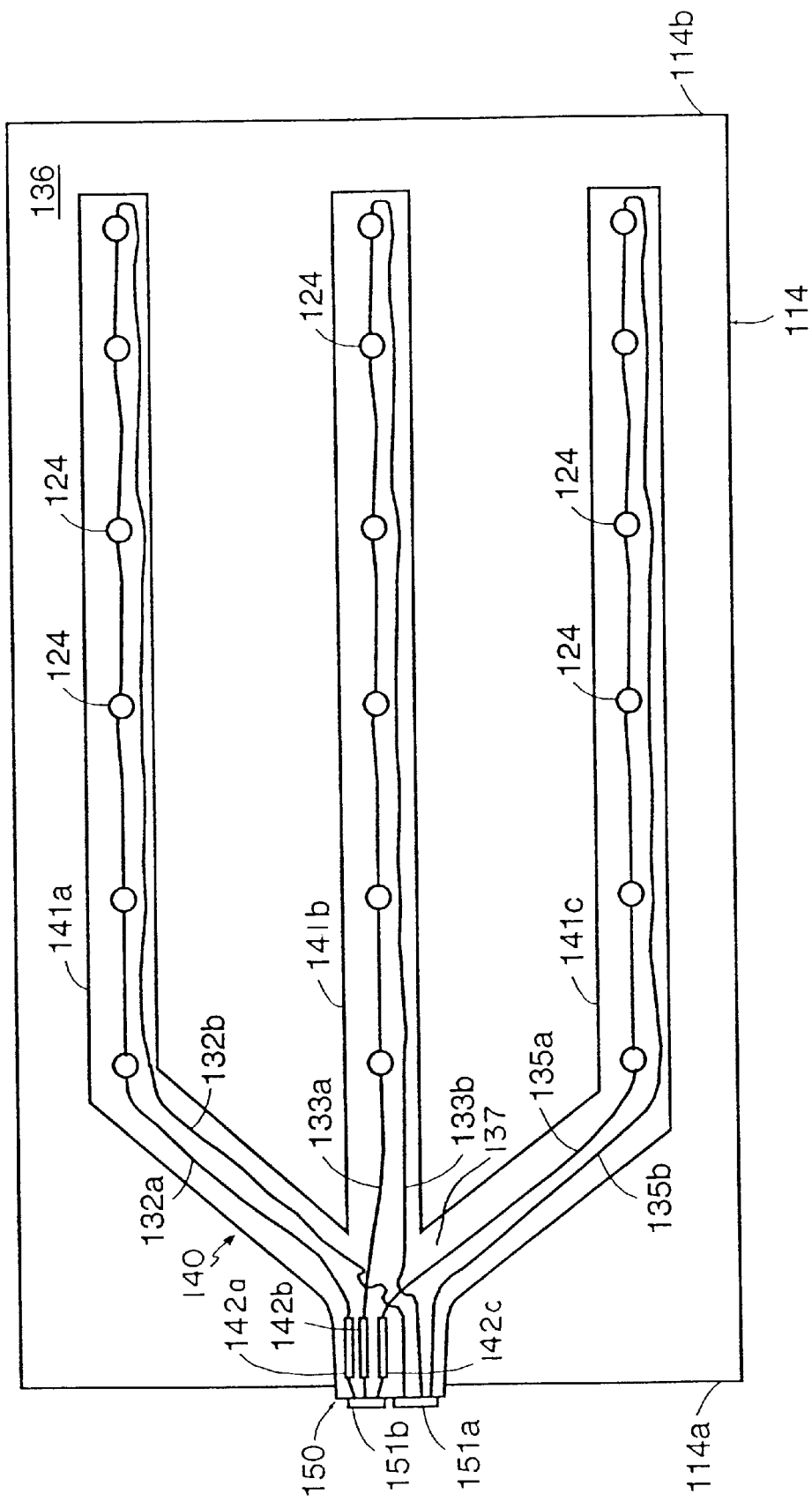
FIG. 4 is a plan view of the ceiling panel of FIG. 3 illustrating its second or upper surface.

Further description of the present invention is now made with reference to FIGS. 2–5. FIG. 2 is a cross-sectional view of a ceiling panel 114 illustrating a light element 124 embedded therein, FIG. 3 is an isometric view of the lower surface of ceiling panel 114, FIG. 4 is a plan view of the upper surface of ceiling panel 114, FIG. 5A is a partial isometric view of a grid element, and FIG. 5B is an end view of a rail connector. Embedded within the ceiling panel 114 are a plurality of light elements 124. The light elements 124 are preferably ultra-bright, light emitting diodes (LEDs) configured to emit "white" light. Each light element 124, which is best shown in FIG. 2, includes at least one semiconductor diode or chip 126 for emitting light, a protective dome 128, and a base 130. The diode or chip 126 generates the light and is enclosed within the protective dome 128, which is preferably formed from clear, unbreakable plastic.

As shown in FIGS. 3 and 4, each ceiling panel 114 is substantially rectangular in shape and defines a first or lower surface 134 (FIG. 3) and a second or upper surface 136 (FIG. 4). Within the ceiling panel 114, the light elements 124 may be arranged in a plurality, e.g., three, equally spaced rows that run substantially parallel to the longer sides of the panel 114. The light elements 124 are preferably embedded within the panel 114 such that the light they emit is directed away from the nominal plane defined by the first or lower surface 134. In the illustrative embodiment, a plurality of recesses 138 (FIG. 2) are preferably formed in the ceiling panel 114 in order to receive the light elements 124. Each recess 138 may be conical or concave-shaped, and the light element 124 may be mounted at or near the apex or top of the recess 138. The recesses 138 may be made from a reflective, conical or concave-shaped insert. Alternatively, the surface of the recess 138 may be coated or painted with a reflective material so that light from the respective light element 124 is reflected away from the panel 114.

Suitable LEDs for use with the present invention are commercially available from The LED Light Company of North Las Vegas, Nev. Such LEDs have a luminous intensity of approximately 1560 to 5600 mcd, and draw approximately 120 milliwatts (mW) of power. Those skilled in the art will recognize that LEDs typically emit light of a single color. One known method for the light element 124 to produce white light is to have a highly efficient blue diode combined with a phosphors that gives of a broadband "white" glow when excited by the blue light from the diode. Other methods are also possible.

Disposed along the second or upper surface 136 of the ceiling panel 114 is a conductive strip 140 (FIG. 4). The conductive strip 140 preferably has a plurality of segments or legs 141a–c, such that each segment or leg 141a–c corresponds to a row of light elements 124 embedded within the respective panel 114. Each segment 141a–c forming the strip 140 may be ribbon-shaped, and each segment 141a–c may be joined together at a first end 137. The segments 141a–c preferably extend a substantial length of the panel 114. Disposed within the conductive strip 140 is at least one wire for electrically connecting the light elements 124. Preferably, each segment or leg 141a–c has its own power and its own ground wire. More specifically, segment 141a has a power wire 132a and a ground wire 132b. Segment 141b has a power wire 133a and a ground wire 133b. Segment 141c has a power wire 135a and a ground wire 135b. The power and ground wires, e.g., wires 132a–b, for each segment, e.g., segment 141a, are used to wire the light elements 124 for the respective segment into a single series circuit. One or more current limiting resistors 142a–c may be added in series to the electrical circuit of each segment or leg 141a–c.

In the illustrative embodiment, the conductive strip 140 is formed from a flexible material, such as plastic, rubber, etc., and is strong enough to support the light elements 124. That is, the light elements 124 may be fastened or otherwise attached to the conductive strip 140 in a "built-in" manner. The conductive strip 140 may further include an adhesive backing for use in attaching the strip 140 to the second or upper surface 136 of the ceiling panel 114. Alternatively, the strip 140 may be bonded or glued to the ceiling panel 114. Other fastening arrangements or methods could also be utilized.

Grid 116 is preferably formed from a plurality of interlocking, inverted metal "T" rails 146 (FIG. 5A). Rails 146 include an upright segment 146a and a base 146b. The rails 146 are hung from the permanent ceiling 110 by cables 118, and are preferably joined together so as to define a plurality of open, rectangular-shaped spaces into which the panels 114 may be inserted and supported. Panels 114 are preferably placed in the spaces defined by the rails 146 so that the panels' first or lower surfaces 134 face the floor 102 of the room 100. In this way, the light emitted by the light elements 124 is directed in a generally downward direction, thereby illuminating the room 100.

Those skilled in the art will recognize that there are numerous ways to provide or deliver electrical power to the light elements 124 embedded within the ceiling panels 114.

In a preferred embodiment, a direct current (DC) voltage sufficient to power the light elements 124 embedded within the panels 114 is provided in one or more insulated channels which are manufactured into the metal rails 146 of the grid. Disposed along the rails 146 and the panels 114, moreover, are corresponding pairs of electrical connectors configured for mating engagement with each other. More specifically, attached to rail 146 are a plurality of spaced-apart rail connectors 148 (FIG. 5A). The rail connectors 148 may be generally serpentine or L-shaped as best shown in FIG. 5B and have a hook portion 145 configured so that the connector 148 may be "hooked" over the upright segment 146a of the rail 146, thereby securing the rail connector 148 to the rail 146. Mounted to a first segment 148a of the rail connector 148 are a pair of spaced-apart, electrically conductive bands 147a–b that are preferably arcuate or curved so as to provide a spring or bias action relative to the first segment 148a of the rail connector 148.

Coupled to the rail connector 148 is a wire 143 carrying two conductors 143a–b (FIG. 5B). Each conductor 143a–b of the wire 143 is electrically connected to a respective one of the bands 147a–b.

Coupled to the conductive strip 140, which, as described above, is itself attached to the upper or second surface 136 of the panel 114, is at least one panel connector 150 (FIGS. 3 and 4). The panel connector 150 may also be L-shaped and arranged so that a first segment 150a (FIG. 3) extends or hangs over an edge 114a of the panel 114. The panel connector 150 also includes a pair of spaced-apart, electrically conductive bands 151a–b that may be flat or curved. The power wire 132a, 133a, 135a for each segment 141a–c is coupled to one band 151b, while the ground wires 132b, 133b, 135b are coupled to the other band 151a.

To provide electrical power to the light elements 124 within a panel 114, a voltage is applied across the pair of bands 151a–b of the panel connector 150. When the panel 114 is installed in an opening in the grid 116, each band 151a–b of the panel connector 150 mate in electrical engagement with a respective band 147a–b of a rail connector 148 associated with that panel 114. A positive 24 volts DC is then applied to one conductor 143b of wire 143, while the other conductor 143a is electrically grounded. By virtue of the mating engagement between the rail and panel connectors 148, 150, a voltage drop exists across each light element 124 embedded in the panel 114. Assuming there are six light elements 124 coupled to each strip 140 (18 light elements in all), each light element 124 would receive approximately 4 volts DC, which is sufficient power to operate the LED. The size of the current limiting resistor 142, moreover, is preferably selected so that the requisite current flows through the series circuit, e.g., approximately 18 milliamps (mA).

One or more conventional DC power supplies (not shown) may be used to provide the voltage to first conductor 143b. The DC power supply may be mounted in the space between the permanent and suspended ceilings 110, 112. The ground conductor 143a may be electrically connected to a building ground in a conventional manner. Each panel may be powered in a similar manner. That is, one or more rail connectors 148 are positioned along rails 146 to mate with the one or more panel connectors 150 associated with each panel 114.

It should be understood that more than one panel connector may be provided on each panel 114.

Other power delivery arrangements can also be provided. For example, DC power and ground may be provided through the metal rails 146 themselves rather than wires 143. More specifically, attached to the upright portion 146a of each rail 146 may be one or more rail bands. The rail bands may be arcuate or curved so as to provide a spring or bias action relative to the respective rail 146. Coupled to each of the electrically conductive strips 140 that run along the tops of panels 114 are two or more panel bands. The panel bands associated with a given strip 140 preferably extend over opposing edges 114a, 114b of the panel 114.

When a panel 114 is installed in an opening in the grid 116, the panel bands mate with respective rail bands. As a result a circuit is defined between a first rail, the conductive strips 140, and a second rail. To provide electrical power to the light elements, a voltage is applied across each pair of adjacent rails of the frame 116. For example, a positive 24 volts DC is applied to a first (i.e., power) rail, while a second (i.e., ground) rail is electrically grounded. That is, the rails alternate power-ground-power-ground, etc. By virtue of the mating engagement between the rail and panel bands, a voltage drop exists across the conductive strip and thus across the respective light elements 124.

Cross rails (not shown) which extend perpendicularly to and are joined to the alternating power and ground rails must be electrically insulated from either the power and/or the ground rails to prevent short-circuiting the power supply to the light elements 124. Any suitable insulating material may be used. The bottom exposed portion of the T-rails may be insulated to reduce the risk of shock.

It should be understood that if more light elements are desired, additional segments 141 could be added to the conductive strip 140. Similarly, if fewer light elements are required, one or more segments 141 could be removed. Furthermore, if light elements having different power requirements are used, other voltages and currents may be applied.

It should be understood that the conductive strip 140 may alternatively be formed from an electrically conductive material such as copper, and leads (not shown) from the light elements 124 may be attached to strip 140 by crimping, soldering, etc.

Those skilled in the art will also recognize that many ways exist to control the light elements 124 embedded within the panels 114. In a preferred embodiment, the light elements may be controlled on a room-by-room and/or a panel-by-panel basis. That is, all of the light elements in a given room or all of the light elements of a given panel can be controlled so as to be either "on" or "off". This may be accomplished by providing one or more light switches (not shown) within the room 100, each switch being configured to govern one or more panels 114. Alternatively, remotely operable switches may be disposed proximate to the panels 114 and operated by the occupant using a remote control device. By selectively turning different panels 114 on and off within space 100, the occupant can cause the desired lighting to be provided. For example, all of the panels that are located above the occupant's desk or work area may be activated while other panels are turned off. Indeed, the lighting density (i.e., the number of light elements 124 embedded within a single panel 114) may be varied depending on the particular lighting requirements in different areas of the room 100.

Those skilled in the art will recognize that panels 114 may be of various sizes and shapes.

As shown, with the present invention, overhead lighting is provided by a large number of small light elements that are dispersed preferably across the entire ceiling. The individual light emitted from all of these small light elements combine to provide sufficient overall light within the space to perform many tasks, such as reading and working at a computer terminal. This is in contrast to conventional overhead lighting designs in which just a few large lights fixtures are used to illuminate the space. By their nature, these large light fixtures, even with the addition of diffusers, can produce an uneven light.

Colored Light Elements

Although the present invention has been described as using "white" LEDs, colored LEDs may also be advantageously used. For example, the light elements 124 embedded within a single panel 114 may have different colors and/or be controlled so as to emit light of different colors. In addition, a single light element could be configured to selectively emit light of different colors. Different lighting effects can be achieved by varying the color of the light elements 124 embedded within the panels 114 installed in space 100. Indeed, by varying the intensity of red, blue and green LED chips, light of nearly any desired color, including "white," can be created.

Figure 6:
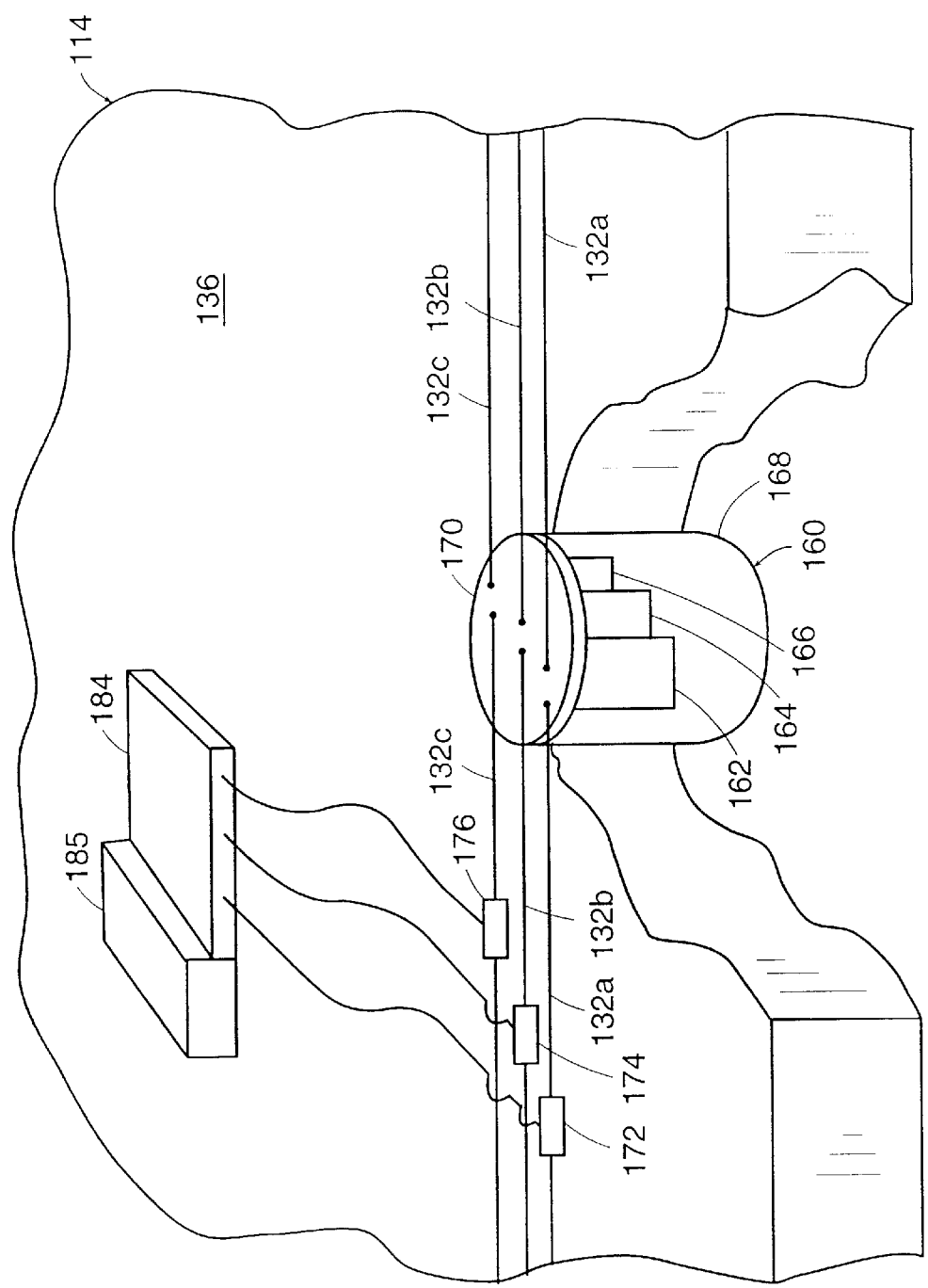
FIG. 6 is a partial isometric view of a ceiling panel having a light element in accordance with another embodiment of the present invention.

FIG. 6 is a partial isometric view of a panel 114 having a multiple diode, light element 160. Light element 160 has a plurality, e.g., three, semiconductor diodes or chips 162, 164, 166 each configured to emit light of a different color, e.g., red, blue and green. The diodes 162, 164, 166 are enclosed inside an outer, protective dome 168, and are mounted to a base 170. Associated with each diode 162, 164, 166 is a wire 132a, 132b, 132c. A separate electrically controlled switch 172, 174, 176, is disposed along each wire 132a–c. Mounted to the upper or second surface 136 of panel 114 is a programmable microcontroller 184 that is operably coupled to each switch 172, 174, 176. As described herein, the microcontroller 184 is configured to control, at relatively high frequencies, the power flowing through each individual wire 132a–c by opening and closing switches 172, 174, 176. Specifically, the microcontroller 184 is used to pulse (i.e., apply power intermittently to) each of the diodes 162, 164, 166 individually such that the "light" resulting from the combined output of diodes 162, 164, 166 has a desired color.

In fact, white light is actually a combination of light of each visible color (e.g., red, orange, yellow, green, blue, etc.). Thus, in addition to the embodiment described above, a "white" LED can also be formed by installing red, blue and green semiconductor diodes within a single bulb or dome, and constantly running all three diodes. The light from each of these "colored" diodes combines to form a "white" light. By pulsing the diodes at different frequencies, however, one color (e.g., blue) can be emphasized over the others, thereby producing a bluish-white light.

An infra-red (IR) detector 185 may be operatively coupled to the micro-processor 184. The IR detector 185 is configured to receive command signals from a remote IR transmitter (not shown). By operating this remote, an occupant of the space can control the color of light emitted by light element 160.

Figure 7:
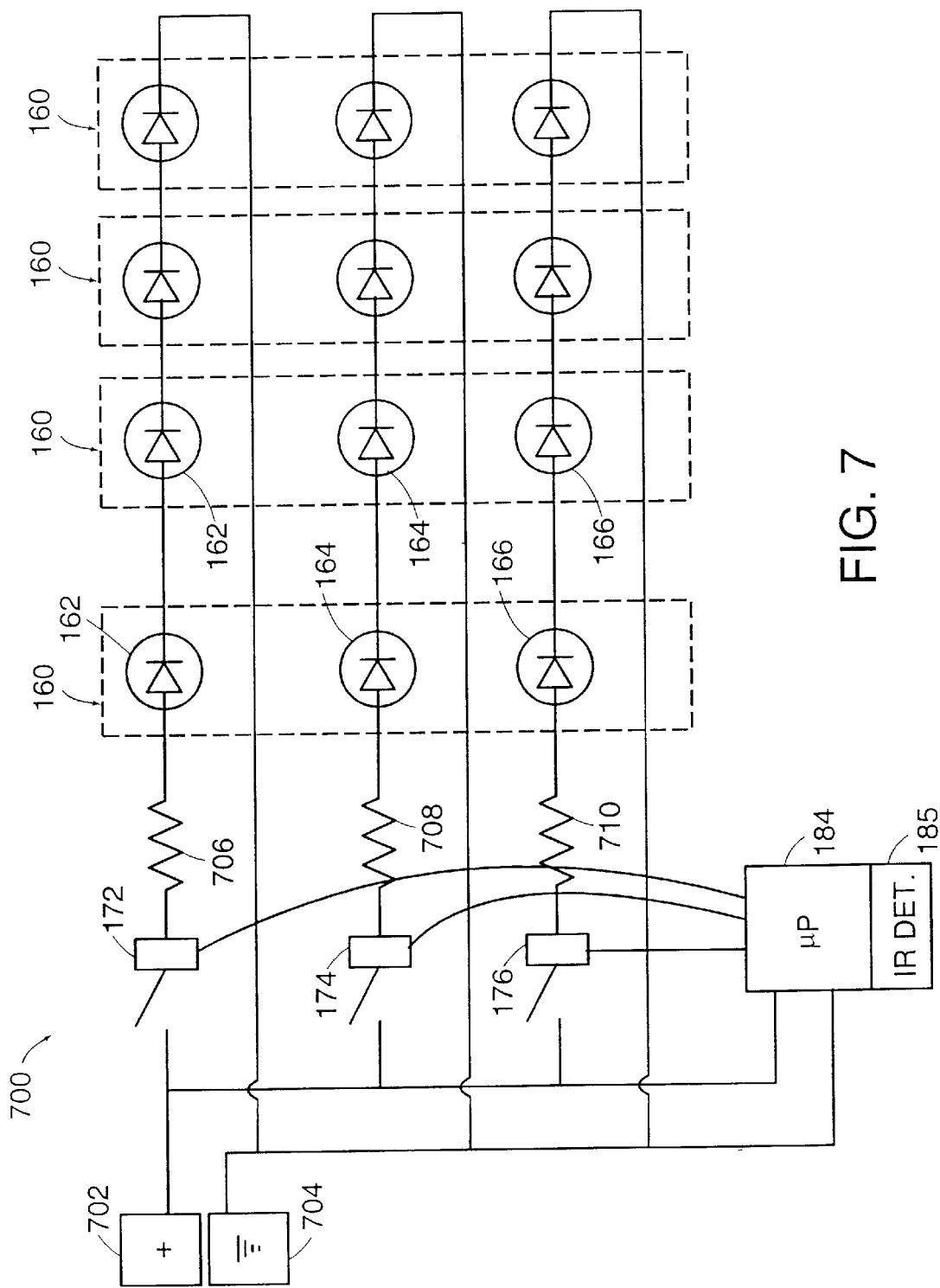
FIG. 7 is an electrical wiring diagram of the ceiling panel of FIG. 6.

FIG. 7 is an electrical wiring diagram 700 for a panel 114 having a plurality of light elements 160, each having a plurality of semiconductor diodes or chips 162, 164, 166. As shown, each semiconductor diode having the same color characteristics, e.g., diode 162 ("red"), of the light elements 160 is preferably wired in a series circuit to a power source 702 and a ground 704. As described above, an electrical switch 172, 174, 176 is disposed in each of these series circuits to open or close electrical power from source 702. Each series circuit also includes a current limiting resistor 706, 708, 710 sized such that a desired current flows through the respective circuit.

In the illustrative embodiment, the power source 702 and ground are also connected to the microprocessor 184 so as to provide electrical power thereto.

Figure 8:
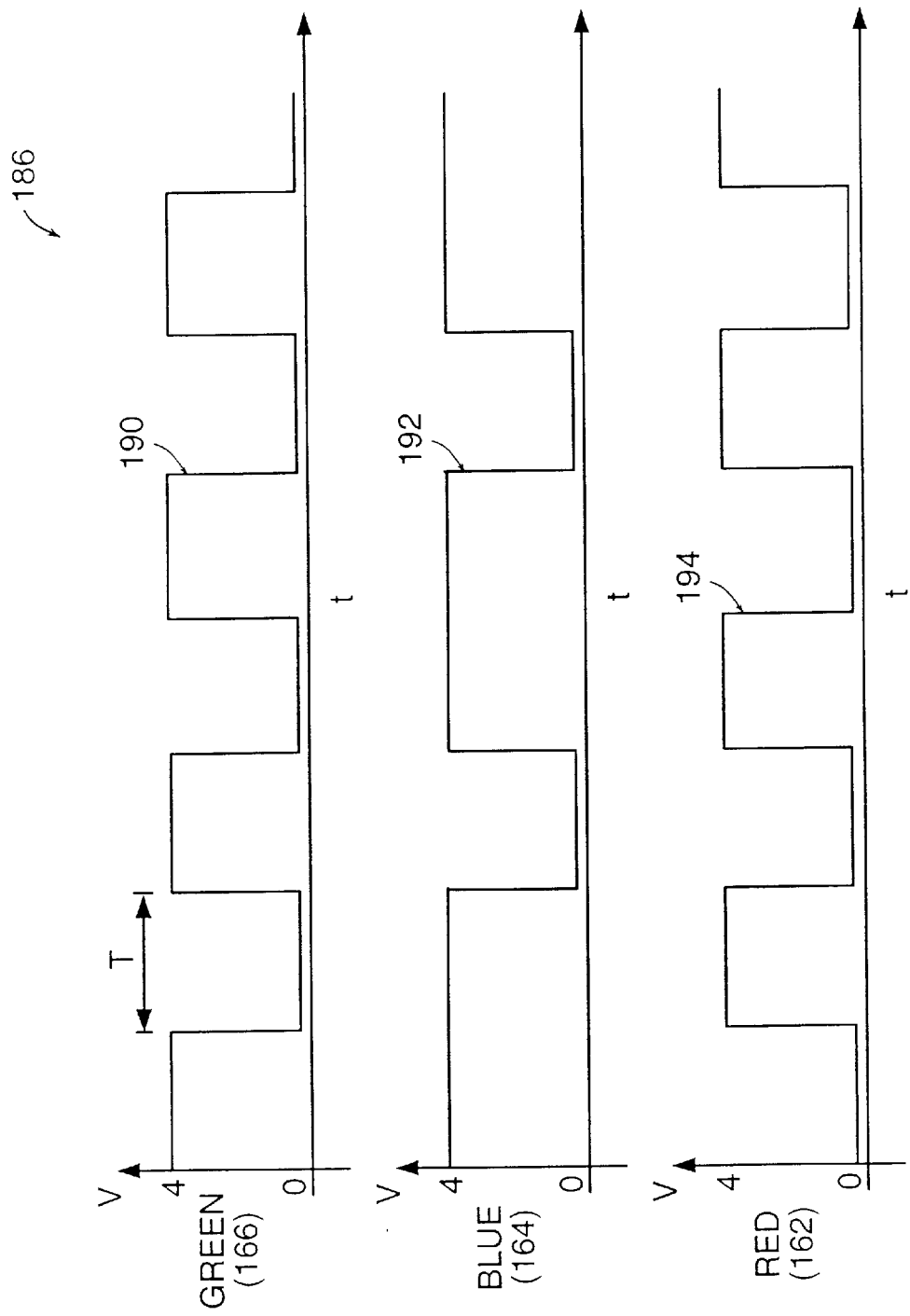
FIG. 8 is a highly schematic representation of a duty cycle for operating the light element of FIG. 6.

FIG. 8 is a highly schematic illustration of a duty cycle used 186 used by the microcontroller 184 to run the multi-diode light element 160 so that it provides a bluish-white light. A first plot 190 shows the voltage (v) applied to the green diode 166 (FIG. 5) as a function of time (t). A second plot 192 shows the voltage (v) applied to the blue diode 164 as a function of time (t), and a third plot 164 shows the voltage (v) applied to the red diode 162 as a function of time (t). As shown, the voltage applied to any diode at any instance of time t is either 4 volts or 0 volts. That is, the respective diode is either "on" or it is "off". The length of time that the diodes are kept on or off relative to each other, however, is varied. In the duty cycle of FIG. 6, for example, both the green and red diodes 166, 162 are pulsed in such as manner that they are "on" for one unit of time T and then off for one unit of time T and so on. The blue diode 164, however, is pulsed differently. In particular, the blue diode 164 is "on" for two units of time T and then off for one unit of time T and so on. Thus, for a given length of time, the blue diode 164 is "on" more often than the red or green diodes 162, 164. The result is perceived as a bluish-white light being emitted by the light element 160 (FIG. 5). Preferably, the selected time T is small enough so that the occupant of the space 100 does not notice any flicker from the light elements.

The microcontroller 184 can be made programmable so that the occupant of the space 100 may adjust the "color" of the light being emitted by the light elements 160 as desired. Indeed, a joystick or mouse could be provided for controlling the "color" produced by the light element 160. Moving the joystick or mouse in a first direction, for example, could emphasize the blue diode, while moving them in second and third directions could emphasize the red and green diodes, respectively.

Suitable microcontrollers for use with the present invention are commercially available from Intel Corp. of Santa Clara, Calif. and Texas Instruments Inc. of Dallas, Tex., among others. Suitable electrical switches, which can be formed from field effect transistors (FETs), are also commercially available.

It should be understood that the light elements may be embedded in other support structures besides ceiling panels. For example, the light elements 124 could be embedded within a flexible material that could be used as wallpaper. Again, the light elements and their wiring would be "built-in" the flexible material. In this case, the flexible material containing the light elements could be uncoiled from a roll and applied to a wall or ceiling of a selected space. A voltage could be applied across the wiring in order to power the light elements.

Furthermore, the light elements 124 may be embedded within the ceiling panel 114 either at the time the panel is manufactured or afterwards. Those skilled in the art will recognize that there are many different ways of embedding or mounting the light elements to ceiling panels either at the time the panels are manufactured or afterwards.

Figure 9:
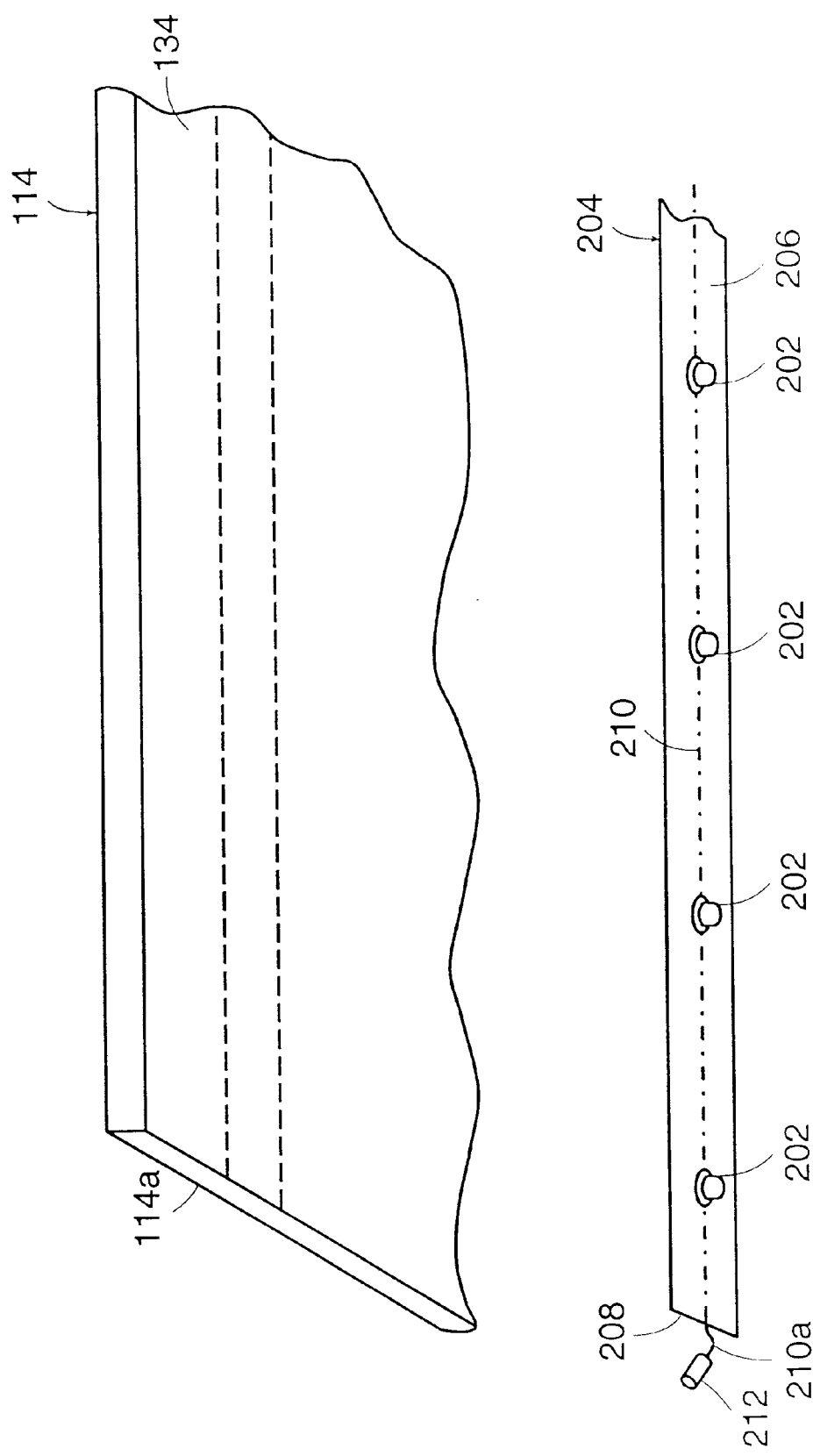
FIGS. 9 and 10 are isometric views of other embodiments of the light elements and support structures of the present invention.

FIG. 9 is an isometric view of a series of light elements 202 mounted to a thin, flexible support medium 204. The flexible support medium 204 defines a first or lower surface 206 from which the light elements 202 preferably project. The support medium 204 may include an adhesive backing (not shown) on a second or upper surface 208. Running through or on the support medium 204 is a wire 210 connecting each of the light elements 202 in series. At a first end 210a of the wire is a connector 212. The support medium 204 with the light elements 202 is preferably attached to the ceiling panel 114 by using the adhesive backing. Alternatively, it may be bonded or glued thereto. Other fastening arrangements or means could also be utilized. The support medium 204 is preferably fastened to the ceiling panel 114 so that the first end 210a of wire 210 wraps around the edge 114a of the ceiling panel 114. Connector 212 is thus disposed in the space defined between the permanent ceiling and the suspended ceiling. A power line having a connector designed to mate with connector 212 is preferably used to supply power to the light elements 202. Another pair of mating connectors (not shown) are preferably used to couple a ground wire to the other end of wire 210, thereby completing the series circuit.

The flexible, ribbon-shaped support medium 204 may be formed from a woven or non-woven material. Exemplary materials include cloth, paper, plastic, metal, fiberglass, carbon, etc. The light elements 202 may be bonded or glued to the support medium 204 or attached by other arrangements.

It should be understood that the support medium 204 and light elements 202 may be used with and/or attached to other building components besides ceiling panels. For example, the support medium 204 may be mounted directly to a permanent ceiling in a room or space which does not have a suspended ceiling. The support medium 204 may alternatively be mounted to a wall.

Figure 10:
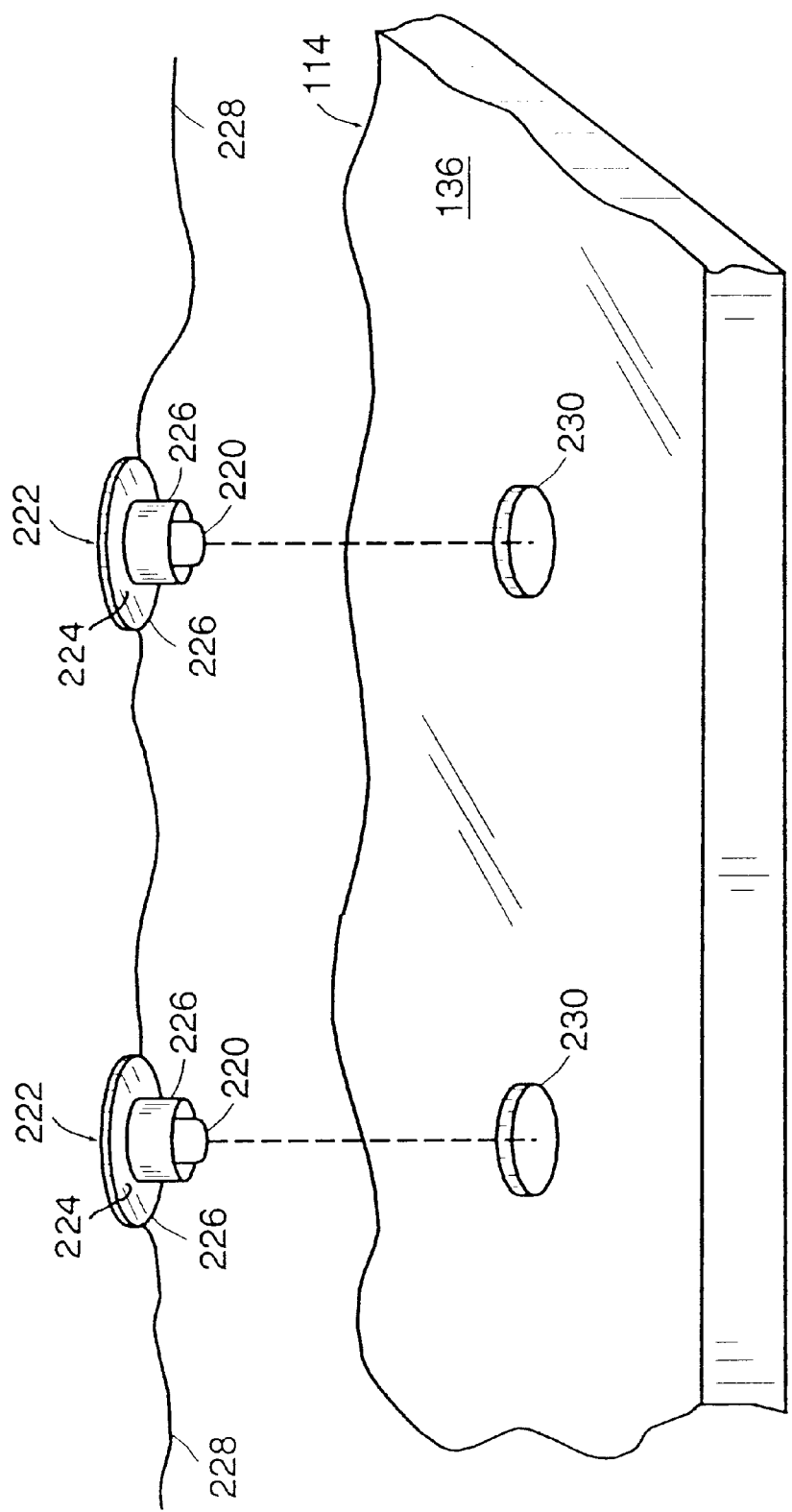

FIG. 10 is an isometric view of a possible although generally less advantageous embodiment of embedding or mounting light elements to a ceiling panel. Here, a plurality of light elements 220 are mounted within respective inserts 222. The inserts 222 preferably include a substantially flat, circular disk 224. Attached to a first face of the disk 224 is a generally cylindrical sleeve 226 within which a respective light element 220 is received. A plurality of wire segments 228 interconnect the light elements 220 in series. A series of spaced-apart holes 230 preferably extend through the ceiling panel 114. Holes 230 are sized and spaced to receive light elements 220. More specifically, holes 230 are sized and shaped so that the sleeves 226, but not the disks 224 fit into the holes 230. The disks 224 thus rest on the second or upper surface 136 of the panel 114 keeping the light elements 220 from falling out when the panel 114 is installed in the suspended ceiling 112 (FIG. 1).

Alternatively, the sleeve 226 could be concave or conical as opposed to cylindrically shaped, and could include a reflective coating. The sleeve 226 could even be omitted and a cone-shaped or concave hole 230 could be formed in the panel 114 to receive the light elements 220.

The foregoing description has been directed to specific embodiments of the invention. It will be apparent, however, that other variations and modifications may be made to the described embodiments, with the attainment of some or all of their advantages. For example, instead of LEDs, the light elements could be formed from laser diodes and/or light emitting polymers (LEPs), among other possible light elements. Therefore, it is an object of the appended claims to cover all such variations and modifications as come within the true spirit and scope of the invention.

What is claimed is:

1. A lighting system comprising
   a panel having opposite first and second surfaces and an edge extending between said surfaces;
   a plurality of light elements, each light element including at least one LED, each LED having an illuminating end and a connection end, the light elements being mounted to the panel in spaced-apart relation thereon so that any light emitted by the LEDs projects primarily away from the first surface of the panel;
   at least one panel connector mounted to the panel away from the first surface thereof, and
   one or more conductors configured and arranged to connect the connection ends of the LEDs with the at least one panel connector.

2. The lighting system defined in claim 1 wherein the one or more conductors extend along the second surface of the panel.

3. The lighting system defined in claim 1 wherein said at least one panel connector is located at the edge of the panel.

4. The lighting system defined in claim 3 wherein
   said at least one panel connector has two contacts, and
   the one or more conductors connect the LEDs in series with said contacts.

5. The lighting system defined in claim 3
   including a second connector located at the edge of the panel, and
   wherein the one more conductors connect the LEDs in series with said at least one connector and said second connector.

6. The lighting system defined in claim 1 wherein
   the first surface of the panel has recesses, and
   at least some of the plurality of LEDs are recessed in said recesses.

7. The lighting system defined in claim 6 wherein the recesses have conical reflective surfaces.

8. The lighting system defined in claim 6 wherein
   said recesses constitute through-holes extending between said first and second surfaces of the panel, and
   said LEDs, said at least one connector and said one or more conductors are all mounted to a strip extending along the second surface of the panel so as to position the LEDs in the through-holes and the at least one connector at the edge of the panel.

9. The lighting system defined in claim 1 wherein
   at least one of the light elements comprises a plurality of LEDs, and
   said conductors connect the plurality of LEDs in separate circuits with the at least one connector.

10. The lighting system defined in claim 9 and further including a separate power controller associated with each of said circuits enabling separate control of each of the plurality of LEDs.

11. The lighting system defined in claim 10 wherein each power controller includes a manual switch.

12. The lighting system defined in claim 10
    wherein each power controller includes a remote control switch responsive to a selected wireless control signal from a remote control unit, and
    further including a remote control unit for emitting the selected control signal for each of said separate power controllers.

13. The lighting system defined in claim 10 wherein at least one of the light elements comprises a plurality of different color LEDs.

14. The lighting system defined in claim 13
    wherein each power controller delivers pulsed power to the associated LED, and
    further including a circuit controller for controlling all of the power controllers in unison so that the light emitted by said at least one light element has a selected color.

15. The lighting system defined in claim 1 and further including means for delivering power to said at least one connector.

16. The lighting system defined in claim 15 where the at least one panel connector is located at said edge of the panel.

17. The lighting system defined in claim 16 wherein the power delivery means comprise
    a plurality of rails supporting said panel at said edge;
    at least one rail connector positioned on one of said rails so as to contact said at least one panel connector, and
    means for conducting power to said rail connector.

18. The lighting system defined in claim 17 wherein the power conducting means include one or more conductors extending along one or more of said rails.

19. The lighting system defined in claim 17 wherein
    at least one of the plurality of rails is conductive, and
    the power conducting means include said at least one conductive rail.

20. A lighting system comprising
    a panel having first and second surfaces;
    a plurality of light elements distributed over the first surface of said panel, each light element including a plurality of different color LEDs for emitting light in a direction primarily away from the first surface of said panel;
    at least one panel connector mounted to said panel away from the first surface thereof;
    one or more conductors configured and arranged to connect the plurality of LEDs in separate circuits with the at least one connector, and
    a separate power controller operably coupled to each of said circuits enabling separate control of each of the plurality of LEDs.

21. The lighting system defined in claim 20
    wherein each power controller delivers pulsed power to the associated LED, and
    further including a circuit controller for controlling all of the power controllers in unison so that the light emitted by said at least one light element has a selected color.

22. The lightening system of claim 1 or 20 wherein
    the panel comprises a flexible sheet or strip, and
    said one or more conductors extend along the sheet or strip.

23. The lightning system of claim 22 wherein the sheet or strip is wall paper.

24. The lightening system of claim 22 wherein the sheet or strip is adhesive tape.

25. The lightening system of claim 22 wherein the panel is a wall panel.

* * * * *